July 15, 1958 — L. A. CONANT — 2,843,646
LAMINATED METAL CERAMIC
Filed June 9, 1953

INVENTOR
LOUIS A. CONANT
BY N. R. Johns
ATTORNEY

United States Patent Office 2,843,646
Patented July 15, 1958

2,843,646

LAMINATED METAL CERAMIC

Louis A. Conant, Tonawanda, N. Y., assignor to Union Carbide Corporation, a corporation of New York Application June 9, 1953, Serial No. 360,453

12 Claims. (Cl. 136—4)

This invention relates to laminated articles and to a method of making such articles by slip casting and refers more particularly to articles at least one layer of which is a metal ceramic and to a process for making such articles.

An object of this invention is to provide an article capable of combining the advantages of two or more different materials while minimizing the disadvantages of the individual material. Another object is to provide a process for fabricating laminated articles of many different shapes that have heretofore been incapable of being produced. A further object is to provide a simple economical process for fabricating an article made of a plurality of layers. Another object is to provide a method of producing such articles in which at least one of such layers is a metal ceramic. A more specific object is to provide a protected metal ceramic article capable of resisting attack by molten metal, corrosive gases and liquids, and other deleterious reagents.

Laminated articles generally are advantageous in that they have better mechanical properties than single-ply articles. Also an outer layer can protect an inner layer from a damaging environment. Particular examples of fields of application where laminated articles would be useful are the fields of high temperature and corrosive media. For conciseness this invention will be described with particular reference to the high temperature field and to the production of laminated articles of which at least one layer is composed of a metal ceramic for use at high temperatures.

In the field of high temperature materials, laminates consisting of a base material with a protective coating or consisting of multiple layers have not been satisfactory. Existing methods are not amenable to the production of multiple layers. These existing methods consist essentially of spray or dip coating on a prefabricated article of a protective coating containing fluxes or other means for lowering the sintering point of the coating to permit refiring at a lower temperature than that used in the fabrication of the original base material. Thus the service temperature of the resulting article is limited by the comparatively low melting point of the coating. This is particularly true of enamel type coatings which contain various ceramic ingredients of a low melting or softening point to promote adherence to the base material.

One application in which the attack of molten metals must be resisted involves the use of a coated thermocouple protection tube for immersion in a molten metal. Metal ceramic tubes consisting of chromium and alumina (described in the prior application of Conant et al., Serial No. 140,442, filed January 25, 1950 and issued on January 11, 1955 as U. S. Patent No. 2,698,990), are now employed to protect various types of thermocouples from the attack of molten metal. It has been found that such metal ceramic tubes are far superior to the older "all ceramic" type tube since they are more impervious to the molten metal, are much stronger and have considerably better thermal shock resistance, or resistance to spalling. Such tubes however on long immersion in molten metals, are attacked or are penetrated at a rate which appears to be dependent on the nature and temperature of the molten metal. It is thus desirable for long time immersion, as is required in the brass industry for example, where certain types of induction furnaces are controlled by means of a thermocouple, to protect the metal ceramic tube by means of an outer and inner coating of some material that is not readily wet and not reactive with the molten metals. Aluminum oxide was found to be well suited for such a protective coating, but the application of this material to the metal ceramic tube was most difficult. Spraying or painting or dipping of the fired tube in aluminum oxide slurry or slip was not successful since it frequently resulted in cracked or otherwise imperfect coatings. It is possible to spray or paint the "as slip cast" unfired tube (green tube), with an aluminum oxide slurry or slip, and then fire it. However. such a technique does not give an adherent dense coat after firing. Considerable difficulty is also involved in spraying or painting such an object since it is quite likely to soften and lose its shape because it becomes too wet. Thus dipping the green object in a slurry or slip of alumina would be unsatisfactory because the tube would disintegrate to a slip itself or to a soft rubbery mass. It is possible to prefire the slip cast article to a temperature, below its maturing temperature, but which will permit dipping or spraying the article and subsequently firing the coated article to mature both the article and the coating. This procedure however results in inferior coatings with poor adherence and furthermore requires an additional firing. It can thus be seen that such a laminated or coated tube is difficult to prepare and once it is prepared is generally unsatisfactory. However, by the novel method now to be described these difficulties are circumvented, and laminated or coated tubes of a superior quality can now be produced.

The process of the invention for producing laminated articles of any desired number of multiple layers involves slip casting the layers successively, beginning with the outermost layer and adding additional inner layers as desired, then sintering the article as a unit to develop the desired density and strength in the laminated article. The application of this method is limited to those cases where the materials comprising the several layers are amenable to slip casting and where these several materials can be simultaneously sintered without undesirable chemical interaction.

It should be noted that the expressions "laminate" or "laminated article" includes coated articles. Thus, an article with a coating on one external surface may be considered as a two-ply laminate and an article with coatings on two parallel external surfaces as a three-ply laminate.

Metal ceramics are composed of a metal phase and a ceramic phase, the metal phase conventionally including at least one refractory metal and the ceramic phase conventionally including at least one metal oxide of the refractory type, such as alumina, zirconia or the like. A variety of metal ceramic compositions can be used in preparing the articles of this invention. Typical of such are the following:

A—Chromium-alumina
B—Chromium-alumina-titania
C—Chromium-molybdenum-alumina-titania
D—Chromium-molybdenum-alumina-tantalum pentoxide
E—Chromium-tungsten-alumina
F—Chromium-tungsten-calcium zirconate In order to select the combination of materials which can be made into a single laminated article, three principles can be used as guides. (1) Since the components of a given metal ceramic are mutually compatible, any material which is a component of a metal ceramic can be laminated with that metal ceramic. For example, alumina can be laminated with chromium-alumina metal ceramic. (2) Also in view of the mutual compatibility of the components of a given metal ceramic, a metal ceramic layer can be laminated to a layer of metal ceramic made up of the sme oxide and metal but having a different ratio of oxide to metal. For example, 30% chromium-70% alumina can be laminated with 50% chromium-50% slip into the cavity, allowing it to stand for three to ten seconds then pouring out. The five-ply tube so produced is allowed to set-up in the mold for three to ten minutes and then removed from the mold. After drying, the tube is fired at about 1700° C. for about one hour in a protective atmosphere such as hydrogen or argon.

The following table gives slip casting data for some other laminated metal-ceramic articles which have been produced.

| Item No. | Number of Plies | Composition of Layers | Order of Casting | Time in Seconds Slip in Mold Before Draining |
| --- | --- | --- | --- | --- |
| 1 | 2 | $Al_2O_3$ | 1 | In and Out |
|   |   | 77Cr—23$Al_2O_3$ | 2 | 20–30 |
| 2 | 2 | 77Cr—23$Al_2O_3$ | 1 | 20–30 |
|   |   | $Al_2O_3$ | 2 | 3–10 |
| 3 | 2 | $Al_2O_3$ | 1 | 15 |
|   |   | 76.9Cr—21.9 $Al_2O_3$—1.2$TiO_2$ | 2 | 30 |
| 4 | 2 | $Al_2O_3$ | 1 | 5 |
|   |   | 35.1Mo—44.1Cr—18.7$Al_2O_3$—2.1$TiO_2$ | 2 | 30 |
| 5 | 4 | 35.1Mo—44.1Cr—18.7$Al_2O_3$—2.1$TiO_2$ | 1 | 40 |
|   |   | 64.0Cr—36$Al_2O_3$ | 2 | 10 |
|   |   | 42.0Cr—58$Al_2O_3$ | 3 | 5 |
|   |   | $Al_2O_3$ | 4 | 5 | alumina. (3) Furthermore a laminated article can be made from any combination of metal ceramics with each other or with the component ingredients of these metal ceramics provided that the sintering temperatures are compatible and that no undesirable interactions occur between the phases. This is illustrated by laminates composed of (chromium - molybdenum - alumina - titania) (chromium-alumina) (alumina). The ceramic layer of the laminate is preferably of a thickness between about 0.001 and 0.020 inch.

Referring to the drawings.

Figure 3:
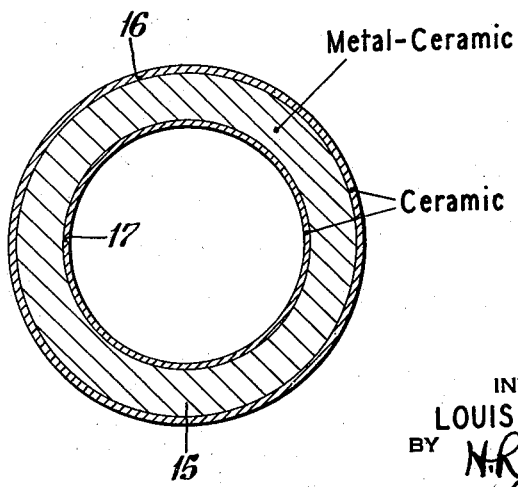
Fig. 3 is a section on another embodiment of a protector tube embodying this invention.

The following example typifies the practice of the method of this invention for the production of a particular article. In this instance the article to be fabricated is a closed end tube 9 to be used to protect a thermocouple 8 against molten metals or corrosive gases, the tube being about 3 inches long by about 5/16 inch outside diameter and about 1/4 inch inside diameter. An aqueous alumina slip, peptized with hydrochloric acid, of density 1.20 grams per cc. and a pH of about 4.5 is poured into a plaster mold and then poured out, by inverting the mold, as soon as the slip fills the mold. This produces a thin external alumina coat about .005 inch thick, the exact thickness depending on the dryness of the mold. In this application a thin external coat is preferred because, as is well known, thin coatings are in general more adherent and more resistant to spalling or thermal shock than thick coatings. A metal ceramic slip, prepared according to the directions given in Serial No. 140,442, now U. S. Patent No. 2,698,990, containing 77% chromium and 23% alumina by weight and having a density of about 3.65 grams per cc., is poured into the cavity, allowed to remain for three to five seconds and then the excess slip poured out. This produces the metal ceramic layer 11 which is substantially thicker than the outer alumina coat 10, the exact thickness again depending on the condition of the mold. A second layer of alumina 12 is then slip cast onto the inner surface of the chromium-alumina layer by pouring the alumina slip into the cavity, allowing it to stand for five to ten seconds, then pouring out. Another layer of chromium-alumina 13 is then slip cast on the inner surface of alumina layer 12 by pouring the chromium-alumina slip into the cavity allowing it to remain three to five seconds, then pouring it out. Finally an internal coating 14 of alumina is slip cast onto the internal surface of the chromium-alumina layer 13 by pouring the alumina Tubes made according to this invention have proved outstanding for use in molten metals. For example a tube such as that illustrated in Fig. 3 where the external and internal laminae, 16 and 17 respectively, are alumina and the body of the tube 15 is 77% chromium-23% alumina by weight has been used for measurement of steel bath temperatures in an open hearth furnace. Comparative tests were made using the conventional vitreous silica tube and an unlaminated 77% chromium-23% alumina metal-ceramic tube. These measurements are made by dipping the tube and its contained thermocouple into the molten steel for approximately one half a minute, reading the temperature and withdrawing the tube. Silica tubes traditionally are used only for one measurement since they soften under the influence of the molten steel. The unlaminated metal ceramic tube withstood the effects of the steel, but the chromium of the metal ceramic poisoned the platinum of the thermocouple to destroy its value as a temperature measuring means. The laminated tube of Fig. 3 withstood twelve dippings before it was accidentally broken. Moreover the thermocouple was adequately protected by the interior lining of alumina.

Figure 1:
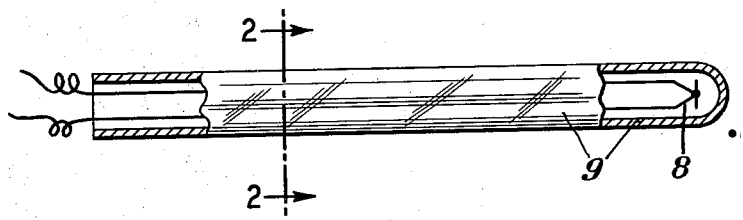
Fig. 1 shows one embodiment of this invention.
Figure 2:
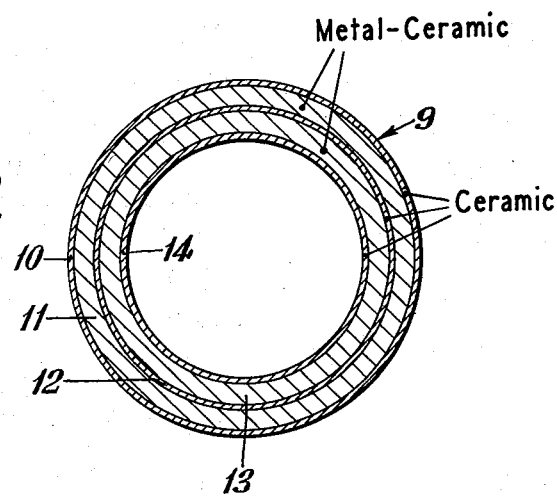
Fig. 2 is a section on the line 2—2 of Fig. 1.

In molten aluminum an unlaminated chromium-alumina tube lasted about thirty five hours whereas a laminated tube of Fig. 2 lasted over 1200 hours.

In molten brass conventional ceramic tubes were found to have lives of ten to one hundred hours before failure by infiltration of metal and for thermal shock, unlaminated chromium-alumina tubes lasted about three hundred hours before they became infiltrated with molten brass whereas a laminated tube (exterior alumina coating) was still in good operating condition after five hundred hours. These tests were conducted in a commercial brass foundry under normal operating conditions.

In some cases a single coat is not sufficient for applications involving thermal shock or long-continued immersion in molten metals since a small imperfection in the coat may initiate a point of failure. In order to avoid this difficulty, multiple-layer laminates such as Fig. 2 can be used. Laminated tubes have been made with from 2 to 31 plies.

The properties of a laminated article are of course affected by the properties of the materials composing the layers and items 3, 4 and 5 of table above illustrate improved chromium-alumina type metal ceramics which have been made into laminated articles according to this invention. These compositions are disclosed in the co-pending application of L. A. Conant, Serial No. 140,442, filed January 25, 1950, and issued on January 11, 1955, as U. S. Patent No. 2,698,990.

In some cases, for instance where high strength and very high thermal shock resistance is required along with moderate resistance to corrosion or oxidation it may be desirable to use an article the body of which contains a high proportion of metal in a metal ceramic coated with a layer or layers of metal ceramic containing greater proportions of ceramic rather than with pure ceramic. Such graded structures would also be susceptible to less internal stress due to differing coefficients of expansion than structures involving more abrupt changes in composition. An article with such a graded structure is illustrated in item 4 of the table above.

Besides being used for a protective tube a laminated structure like that shown in Fig. 2 for example, is useful when made into a tube having both ends open for the purpose of supplying gas or gases into a molten metal bath. The laminated construction of this invention is also useful as a crucible. This type of construction is eminently satisfactory for turbine blades, extrusion dies, hot-pressing dies and the like. Laminated bars have also been made by this method. For instance a laminated cylinder about 6 inches long by about ½ inch diameter was prepared for test as a heating element in which the central electrically conducting core contained 77% chromium-23% alumina by weight covered with six thin alumina layers each pair of alumina layers being interleaved with thin chromium-alumina layer. In general it may be said this method is suitable to the production of laminated articles in any shape and size which can be fabricated by slip casting.

Among the advantages of this invention may be mentioned that the slip casting process is simple, economical, and easy to perform enabling the fabrication of many shaped articles that cannot be formed any other way. For example no other economical and practicable way is presently known for making a long tube resistant to penetration of molten metal than by the slip casting of the laminated product of this invention. There may be as many laminations as desired and all laminations are fabricated at the same time by sintering all of them simultaneously when, as here the ceramic layer has a sintering temperature which overlaps at least in part the sintering temperature of the metal of the metal ceramic. Due to this simultaneous sintering no adhesive or other usual bonding agent is needed. It is not necessary to lower the sintering temperature of the ceramic as has been needed when a ceramic layer has not been sintered simultaneously with its foundation. The product of the present invention may partake of the heat resistance of the ceramic layer and at the same time the strength of the metal used in the metal ceramic. The cohesion in a green or unfired laminated product of this invention made by slip casting is stronger than is a laminated product attempted to be made in any other way, as by spraying, painting or dripping. The cohesion between laminations is also stronger in the sintered product of this invention than would be the case if it were made in any other way.

As stated in the aforementioned applications of Conant et al. the particle size in the metal ceramic and in the ceramic should be smaller than about 325 mesh to enable the particles to form the suspension needed for slip casting. A porous mold such as the customary one of plaster of Paris is desirable to absorb water in the cast slip.

When a metal ceramic is formed according to the process described in the aforementioned application, Serial No. 140,442, filed January 25, 1950, and issued on January 11, 1955, as U. S. Patent No. 2,698,990, the metal phase will be continuous as therein mentioned, which can be tested for continuity electrically and microscopically in ways known to the art. A continuous metal phase in a metal ceramic is often desirable to provide electrical conductivity, thermal conductivity, a quicker attainment of thermal equilibrium, and therefore a better resistance to thermal shock. From that earlier application between about 50% and 75% of metal by volume is necessary for attainment of a continuous metal phase, and the balance or between about 50% and 25% of refractory metal oxide ceramic is also present in the chromium-alumina type metal ceramic. The absorption of water by the mold walls is believed to be a factor enabling as thin layers as are herein mentioned to be formed in the green or unfired state more nearly uniform in thickness than is possible with spraying, dipping, etc. This advantage applies not only to a layer contiguous the mold surface but also to subsequently slip cast layers. The step of sintering the metal ceramic layers in an inert atmosphere as described aids in the formation of continuity in the metal phase because the formation of oxide coatings on the metal particles is thus prevented and such coatings might obstruct the continuity of a metal path being formed. Such earlier application referred to shows that particle sizes for the ceramic of .1 to 10 microns and for the metal less than 324 mesh are useful. It is known in the slip casting art that in general smallness in particle size of the materials being molded contributes to strength of the material molded while it is in the green and unfired state. A suspension acidified to a pH of about 4.5 was found desirable in that earlier mentioned application. Since sintering has been defined as a solid state diffusion, the reason for the superior cohesion between laminations in this invention may be due not only to the sameness in coefficients of thermal expansion for the alumina in contiguous layers but also to perhaps at least a slight interdiffusion between the ceramic sintered particles in such contiguous layers.

The metal ceramics (not laminated) and containing both chromium and molybdenum are claimed in the co-pending application of L. A. Conant, Serial No. 430,987, filed May 19, 1954, for Metal Ceramic Product.

I claim:

1. A ceramic object adapted for contact with deleterious reagents such as molten metals comprising a refractory metal ceramic base containing intimately dispersed minute particles of about 50% to 75% by volume of chromium metal and a refractory metal oxide with said chromium metal forming a continuous metal phase therein and having cohesively and thermally secured to at least one contact surface of said refractory metal ceramic base a refractory ceramic coating containing the same refractory metal oxide which is intimately dispersed within said refractory metal ceramic base, said refractory ceramic coating having a thickness between about 0.001 and 0.020 inch.

2. A laminated product having a metal ceramic layer containing intimately dispersed minute particles a major portion of which is refractory metal and a minor portion of which is at least about 25% by volume of a refractory metal oxide with said refractory metal forming a continuous metal phase and with said refractory metal oxide having been thermally bonded therein by sintering, and at least one contiguous ceramic layer containing a larger percentage of the same sintered refractory metal oxide thermally bonded to said refractory metal in said first-mentioned layer, said ceramic layer having a thickness between about 0.001 and 0.020 inch, said layers having a sintering temperature in common above about 1600° C.

3. A laminated product according to claim 2 in which said metal ceramic layer contains intimately dispersed minute particles of chromium and alumina with said chromium metal forming a continuous metal phase therein and in which said contiguous layer is of alumina.

4. A sintered laminated product containing a metal ceramic layer of intimately dispersed minute particles of chromium and alumina with said chromium metal forming a continuous metal phase therein and a contiguous layer of alumina of a thickness between about 0.001 and 0.020 inch being cohesively and thermally bonded thereto by materials of each of said layers.

5. A tube according to claim 1 in which said ceramic coat is between about .001 to .020 inch thick on at least the inside of said tube.

6. A tube according to claim 1 in which said ceramic coat is between about .001 to .020 inch thick on at least the outside of said tube.

7. A protective tube for a thermocouple comprising a coating of alumina about .001 to .020 of an inch thick cohesively secured to a metal ceramic comprising about 77 percent sintered particles of chromium and about 23 percent aluminum oxide by weight.

8. A thermocouple protective tube for insertion in molten metal and closed at one end having on both its inner and outer surface a thin protective ceramic layer of alumina at least about 0.001 of an inch and not more than about 0.020 of an inch thick, with at least one metal ceramic layer of a chromium-alumina type metal ceramic cohesively bonded to said alumina layer.

9. A laminated product according to claim 2 in which said contiguous layer is substantially 100% the same ceramic as is in the metal ceramic.

10. A laminated product according to claim 2 in which said contiguous layer is thinner than said metal ceramic layer.

11. A laminated product according to claim 2 in which said metal ceramic layer is bonded between two of said contiguous layers each of which is thinner than said metal ceramic layer.

12. A laminated product according to claim 2 in which additional metal ceramic layers are similarly bonded to the first mentioned layer but with a contiguous layer of a larger percentage of ceramic between each two metal ceramic layers.

References Cited in the file of this patent

UNITED STATES PATENTS

| | | |
|---|---|---|
| 1,675,119 | Marden | June 26, 1928 |
| 1,713,751 | Dorogi | May 21, 1929 |
| 1,773,825 | Simms | Aug. 26, 1930 |
| 1,896,123 | Schweitzer | Feb. 7, 1933 |
| 2,177,046 | Sweo | Oct. 24, 1939 |
| 2,277,543 | Downs | Mar. 24, 1942 |
| 2,568,881 | Albers-Schoenberg | Sept. 25, 1951 |
| 2,656,857 | Cavallier | Oct. 27, 1953 |
| 2,698,990 | Conant et al. | Jan. 11, 1955 |

FOREIGN PATENTS

| | | |
|---|---|---|
| 190,657 | Great Britain | Dec. 28, 1922 |

UNITED STATES PATENT OFFICE
CERTIFICATE OF CORRECTION

Patent No. 2,843,646                        July 15, 1958

Louis A. Conant

It is hereby certified that error appears in the printed specification of the above numbered patent requiring correction and that the said Letters Patent should read as corrected below.

Column 1, line 48, for "productiion" read -- production --; column 3, line 7, for "sme" read -- same --; column 5, line 55, for "dripping" read -- dipping --.

Signed and sealed this 21st day of April 1959.

(SEAL)
Attest:
KARL H. AXLINE
Attesting Officer

ROBERT C. WATSON
Commissioner of Patents